(12) United States Patent
Zhang et al.

(10) Patent No.: US 7,852,643 B2
(45) Date of Patent: Dec. 14, 2010

(54) CROSS CURRENT CONTROL FOR POWER CONVERTER SYSTEM

(75) Inventors: Richard S. Zhang, Rexford, NY (US); Changyong Wang, Shanghai (CN); Zhuohui Tan, Shanghai (CN); Haiqing Weng, Shangai (CN)

(73) Assignee: General Electric Company, Niskayuna, NY (US)

( * ) Notice: Subject to any disclaimer, the term of this patent is extended or adjusted under 35 U.S.C. 154(b) by 529 days.

(21) Appl. No.: 11/823,714

(22) Filed: Jun. 27, 2007

(65) Prior Publication Data
US 2009/0003020 A1 Jan. 1, 2009

(51) Int. Cl.
*H02J 1/10* (2006.01)
(52) U.S. Cl. .......................... 363/65; 363/67
(58) Field of Classification Search ............... 363/34, 363/51, 71, 98, 65, 67, 69; 323/266
See application file for complete search history.

(56) References Cited

U.S. PATENT DOCUMENTS

| | | | | |
|---|---|---|---|---|
| 5,963,084 | A * | 10/1999 | Eschauzier | 327/553 |
| 6,366,483 | B1 * | 4/2002 | Ma et al. | 363/87 |
| 6,472,775 | B1 * | 10/2002 | Huang et al. | 307/105 |
| 6,621,252 | B2 * | 9/2003 | Zhang | 323/205 |
| 6,751,106 | B2 * | 6/2004 | Zhang et al. | 363/71 |
| 6,917,271 | B2 * | 7/2005 | Zhang et al. | 336/160 |
| 7,109,681 | B2 * | 9/2006 | Baker et al. | 318/801 |
| 7,253,537 | B2 * | 8/2007 | Weng et al. | 290/44 |
| 7,324,360 | B2 * | 1/2008 | Ritter et al. | 363/71 |
| 7,362,597 | B2 * | 4/2008 | Ishikawa et al. | 363/71 |
| 7,403,400 | B2 * | 7/2008 | Stanley | 363/16 |
| 7,423,412 | B2 * | 9/2008 | Weng et al. | 322/20 |
| 7,446,435 | B2 * | 11/2008 | Zhang et al. | 307/105 |
| 7,532,490 | B2 * | 5/2009 | Datta et al. | 363/34 |
| 7,561,389 | B2 * | 7/2009 | Ishikawa et al. | 361/42 |
| 7,573,732 | B2 * | 8/2009 | Teichmann et al. | 363/51 |

OTHER PUBLICATIONS

Current Equalization in SPWM FACTS Controllers at Lowest Switching Rates, Bakari Mwinyiwiwa, Zbigniew Wolanski, Boon-Teck Ooi,, pp. 325-330, IEEE 1997.
Modeling and Control of Parallel Three-Phase PWM Boost Rectifiers in PEBB-Based DC Distributed Power Systems, Z. Ye, K. Xing, S. Mazumder, D. Borojevic, F.C. Lee, pp. 1126-1132, IEEE 1998.

* cited by examiner

*Primary Examiner*—Adolf Berhane
*Assistant Examiner*—Yemane Mehari
(74) *Attorney, Agent, or Firm*—Ann M. Agosti (57) ABSTRACT

A system and method for controlling cross current in an interleaved power converter system having a plurality of converter threads coupled in parallel includes collecting a feedback current from each thread and obtaining a normal current and a differential mode current for each thread, based on its respective feedback current. The normal current of each thread is regulated to a commanded thread normal current value via a respective normal current control loop based on d-q rotating frame parameters. A differential mode cross current of each thread is regulated to zero via a respective differential mode cross current control loop based on d-q rotating frame parameters; while a differential mode cross current DC offset of each thread is regulated to zero via a respective differential mode cross current control loop based on stationary frame parameters.

10 Claims, 12 Drawing Sheets

FIG. 16

CROSS CURRENT CONTROL FOR POWER CONVERTER SYSTEM

BACKGROUND

The present invention is directed to cross current control systems and methods, and more particularly to a cross current control system for a power converter system and a method of controlling cross current for a power converter system.

Interleaved operation for multiple power converters in parallel is desirable for high power, due to switching ripple cancellation, to reduce the overall size, weight and cost of the PWM filter for many distributed generation applications, e.g. wind turbine. Paralleling multiple power converters is a common practice in the telecom and UPS (uninterruptible power supply) industries to increase overall system power capacities and to also enhance system reliabilities by building redundancy. Paralleling multiple power converters with interleaved gating operation can prolong generator/motor life time by alleviating, for example, winding heating. Further, paralleling of multiple power converters with interleaved gating operation increases the system control bandwidth because of high effective switching frequencies, and may reduce the system common mode EMI.

Typical examples of such power converters are single phase or three phase converters comprising inverters, rectifiers and DC/DC converters. Typically all the parallel power converters are gated synchronously and are tied together through interphase reactors or isolation transformers. Synchronous gating implies that the gate controls for the parallel converters are perfectly aligned.

Another way to operate the parallel power converters is through interleaved gating. Interleaved gating means that the switching patterns of the parallel converters are uniformly phase shifted, rather than synchronized. Interleaved gating has several advantages such as having reduced harmonic filter size, increased system efficiency, greatly enhanced control dynamic performance, and potentially reduced EMI (electromagnetic interference).

Common mode and differential mode currents that circulate among the paralleled multiple converters or within paralleled converter systems that do not contribute to the output to the load are typically referred to as "cross current." This cross current represents circulating energy, which would increase the power converter loss and de-stabilize the power converter system.

Both synchronous and interleaved gating control embodiments typically result in undesirable cross current with the cross current being more severe in interleaved embodiments. In ideal conditions, synchronous gating does not lead to cross current, but in actual circuits using synchronous gating cross current exists due to mismatched circuit parameters. The foregoing cross currents may be suppressed effectively in both switching frequency and low frequency ranges at steady state and dynamic transient conditions in order to take advantage of interleaved operation.

In view of the foregoing, it would be both advantageous and beneficial to have an improved cross current control system for interleaved operation of multiple power converters, arranged in parallel. It would be desirable if the improved cross current control system also resulted in suppression of cross currents associated both with parallel interleaved converters having transformer coupling and direct coupling.

BRIEF DESCRIPTION

The present invention is directed to controlling cross current in a system of interleaved power converters, arranged in parallel. In one embodiment, a method for controlling cross current in an interleaved power converter system having a plurality of converter threads coupled in parallel includes collecting a feedback current from each thread and obtaining a normal current and a differential mode cross current for each thread, based on its respective feedback current. The normal current of each thread is regulated to a commanded thread normal current value via a respective normal current control loop based on d-q rotating frame parameters. A differential mode cross current of each thread is regulated to zero via a respective differential mode cross current control loop based on d-q rotating frame parameters; while a differential mode cross current DC offset of each thread is regulated to zero via a respective differential mode cross current control loop based on stationary frame parameters.

Another embodiment of controlling cross current in a system of interleaved power converters arranged in parallel comprises determining a thread feedback current in each thread of the interleaved power converter system; and regulating the thread feedback current for each thread via a respective current control loop based on d-q rotating frame parameters, by independently driving each respective thread feedback current towards a normal mode thread current command value.

Yet another embodiment is directed to a cross current control system for a system of interleaved power converters arranged in parallel. The cross current control system comprises a signal processing section configured to collect feedback currents from the plurality of converter threads and determine a normal current and a differential mode current for each thread. A normal current control loop based on d-q rotating frame parameters for each thread is employed to regulate its normal current to a commanded thread normal current value. A differential mode cross current control loop based on d-q rotating frame parameters for each thread is employed to regulate its differential mode cross current to zero; while a differential mode cross current control loop based on stationary frame parameters for each thread is used to regulate its DC value to zero.

Still another embodiment comprises an interleaved power converter control system for a plurality of power converter threads arranged in parallel. The control system comprises a thread current control loop based on d-q rotating frame parameters in each thread of the interleaved power converter control system, wherein each thread current control loop is configured to independently regulate a thread current in a respective thread of the interleaved power converter system by driving its respective thread feedback current towards a normal mode thread current command value.

BRIEF DESCRIPTION OF THE DRAWINGS

Other aspects and features of the present invention and many of the attendant advantages of the present invention will be readily appreciated as the same become better understood by reference to the following detailed description when considered in connection with the accompanying drawings in which like reference numerals designate like parts throughout the figures thereof and wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Figure 1:
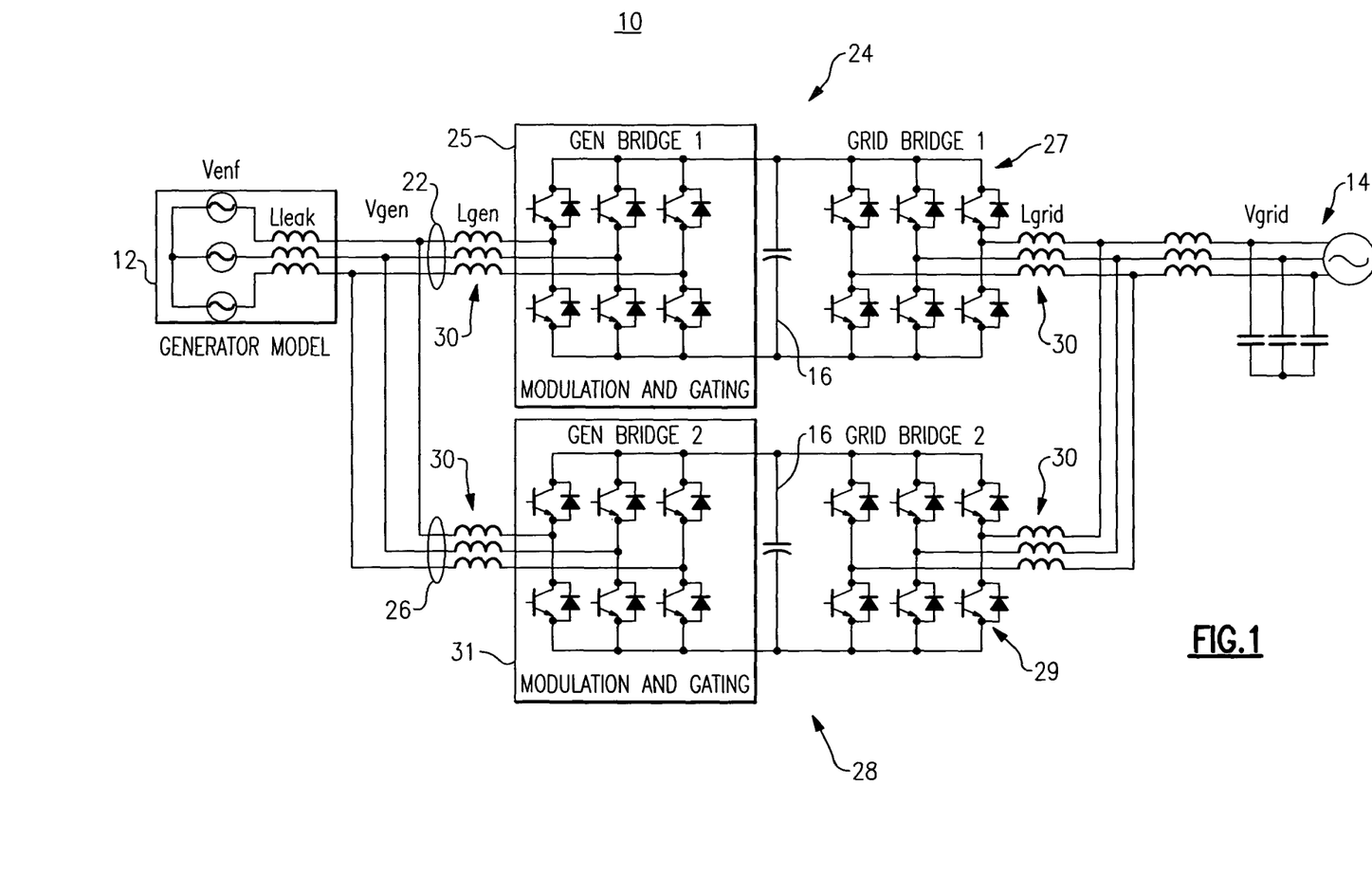
FIG. 1 is a simplified block diagram illustrating a bidirectional power converter system according to one embodiment.

FIGS. 1-9 are directed to providing a preliminary background as well as a detailed description of terms useful to a better understanding of the embodiments described herein below with reference to FIG. 10-16. Looking now at FIG. 1, a circuit diagram illustrates a two-thread power converter system 10. Power converter system 10 is bidirectional and is shown with a source (generator) 12 and a load (grid) 14. Since power converter system 10 is bidirectional, it can also function by replacing the grid 14 with a power source and by replacing the generator with a load (e.g., motor). The embodiment shown in FIG. 1 depicts the power converter system 10 as a power generation system. The generator 12 may also be, but not limited to, for example, a wind turbine generator. The definition of source and load thus depends upon the direction of power flow and the particular application.

The power converter system 10 employs a two level, back-to-back circuit topology. The circuit topology is identical on each side of the DC link 16 and can be seen to include identical three phase, six switch power bridges 25, 27, 29, 31. Two level power converter means the phase voltage is a two level and the line-to-line voltage is a three level (i.e. positive DC link, negative DC link and zero). The present invention is not limited to a two level topology however, and the principles described herein apply equally well to any level power converter (e.g., three level, four level, . . . , etc.).

The embodiments discussed herein, although described for a) a two level circuit, b) a back-to-back circuit, and c) two threads in parallel, are only exemplary. All three features a), b) and c), can just as easily be expanded and applied to broader configurations. The control, for example, is applicable to configurations where only one side has an active bridge, either the rectifier side or the inverter side. Further, configurations that employ more than two threads in parallel, e.g. 3, 4, 5 threads, etc., can be just as easily implemented using the principles described herein for two threads.

The power converter system 10 also is shown with the converter thread 22 of one power converter 24 coupled in parallel with the converter thread 26 of another power converter 28. Power converter system 10 can function with interleaving on either one side or both sides of the DC link 16. Further, although interleaving is depicted through coupling inductors 30, such interleaving can also be implemented through one or more coupling transformers (enumerated 422 in FIG. 16), discussed further herein below with reference to FIG. 16. The use of inductors 30 or coupling transformers 422 is dependent on the particular application, among other things.

A circuit topology that achieves interleaving through inductors 30 will exhibit a common mode cross current that necessarily needs to be controlled. This common mode cross current only exists when inductors 30 are employed on both sides of the DC link 16. A circuit topology that achieves interleaving through transformers 422 on either one or both sides of the DC link 16 will not have a common mode cross current. Thus, the use of transformers 422 instead of inductors 30 on either side of the DC link 16 will result in a circuit topology that does not require control of common mode cross current for wind turbine power generation applications.

Figure 2:
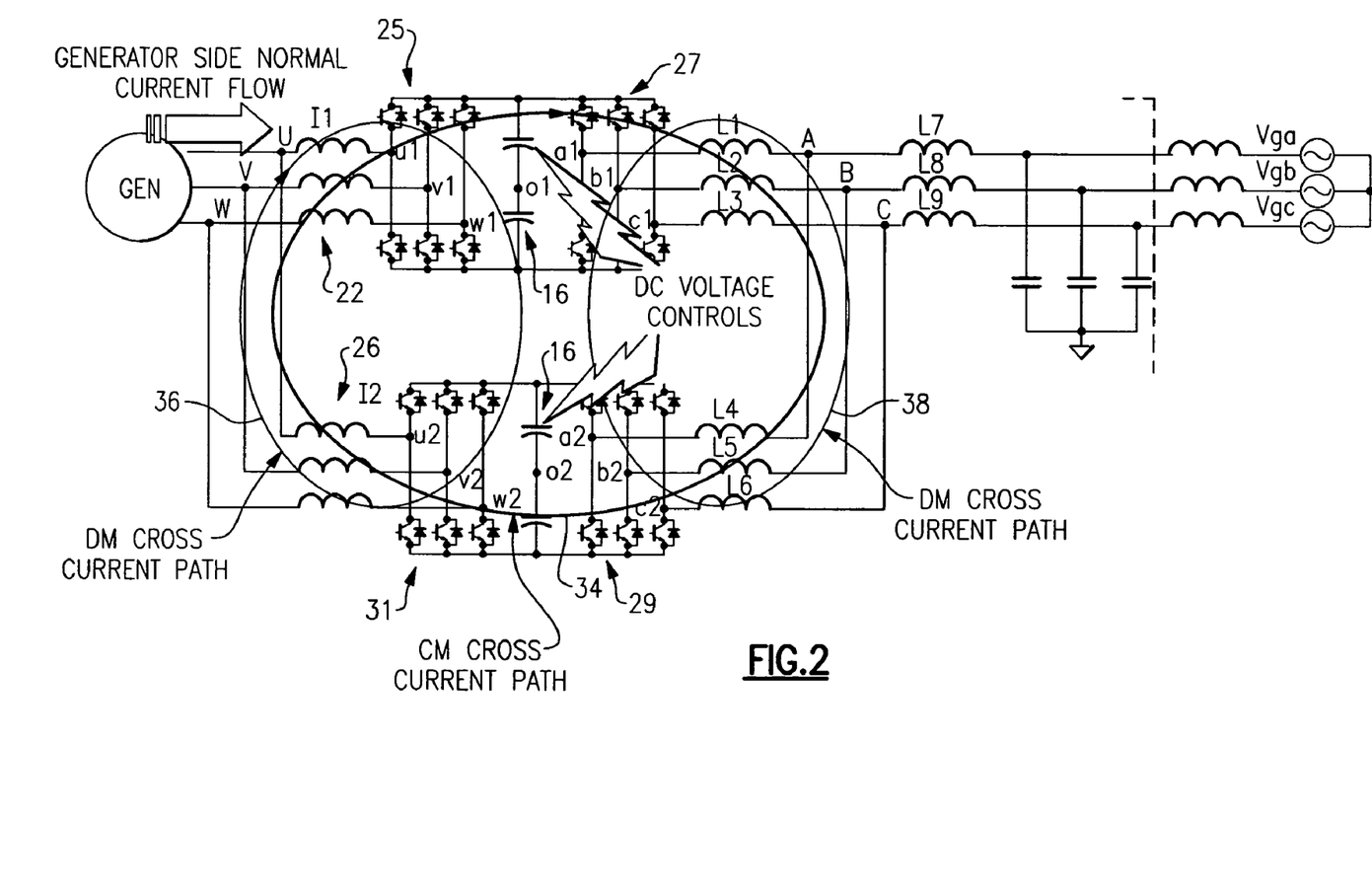
FIG. 2 is a circuit diagram illustrating a common mode cross current loop and differential mode cross current loops for the power converter system shown in FIG. 1.

FIG. 2 is a circuit diagram illustrating a common mode cross current loop 34 and differential mode cross current loops 36, 38 for the power converter system 10 shown in FIG. 1. The common mode cross current loop 34 includes a path through the generator side bridge (converter) 25, through the grid side bridge (converter) 27 of thread 22, and back through the grid side bridge (converter) 29 and the generator side bridge (converter) 31 of thread 26.

Each differential mode cross current flowing in either loop 36 or loop 38 can be seen to flow in a cross current loop that includes a path through one side of the DC link 16. Loop 36, for example, includes a path through the bridge 25 of thread 22 and through the DC link 16 of thread 22, and back through the DC link 16 of thread 26 and then through the bridge 31 of thread 26. One differential mode cross current loop 36 thus links the DC links 16 of both threads together with the bridges 25, 31 of the threads 22, 26 on the generator side of the DC link 16. In similar fashion, differential mode cross current loop 38 links DC links 16 of both threads 22, 26 together with the bridges 27, 29 of the threads 22, 26 on the load side of the DC links 16.

The foregoing common mode cross current and differential mode cross currents can be better understood with reference to the detailed descriptions described herein below. First, the load current or the source current can by definition be equated to the system normal mode current. This is the total net current that needs to be delivered to the load 14 or drawn by the source 12.

$$I_{Norm\text{-}Sys} = \text{total net load or source current} \quad 1)$$

The normal thread current is the contribution of the system normal mode current coming from each thread 22, 26. The normal thread current is therefore equal to the total net current divided by the number of threads.

$$I_{Norm\text{-}Thread} = I_{Norm\text{-}Sys}/N \quad 2)$$

wherein N=number of threads.

Measured thread current (taken at either phase a, b or c), actually includes a contribution to the total net current (normal thread current) delivered to the load 14 or drawn by the source 12 as well as circulating cross currents (e.g., common mode cross current, differential mode cross current) within each thread 22, 26 that do not contribute to the total net current delivered to the load 14 or drawn by the source 12.

$$I_{Thread} = I_{Norm\text{-}Thread} + I_{CC\text{-}Thread} \quad 3)$$

wherein $I_{CC\text{-}Thread}$ is total thread cross current.

The total thread cross current then becomes $$I_{CC\text{-}Thread} = I_{Thread} - I_{Norm\text{-}Thread} \quad 4)$$

wherein $I_{Thread}$ is the measured thread current and $I_{Norm\text{-}Thread}$ is measured or calculated.

The thread cross current has two components including a common mode cross current $I_{CM\text{-}CC\text{-}Thread}$ and a differential mode cross current $I_{DM\text{-}CC\text{-}Thread}$, where the thread (i.e. system) common mode cross current is defined by $$I_{CM\text{-}CC\text{-}Thread} = [I_{Thread(a)} + I_{Thread(b)} + I_{Thread(c)}]/3 \quad 5)$$

The differential mode cross current is then defined by $$I_{DM\text{-}CC\text{-}Thread} = I_{CC\text{-}Thread} - I_{CM\text{-}CC\text{-}Thread} \quad 6)$$

The transformation from stationary coordinates, where all variables are three-phase AC in steady state, to d-q rotating coordinates, where all variables become DC in steady state, is a common practice in the field as a powerful tool to design control parameters and to analyze control stability and performance. This practice is employed because the control target in steady state becomes a fixed value, as compared with time varying AC curves. Therefore, the cross current control embodiments described herein are implemented in d-q rotating frame.

Figure 3:
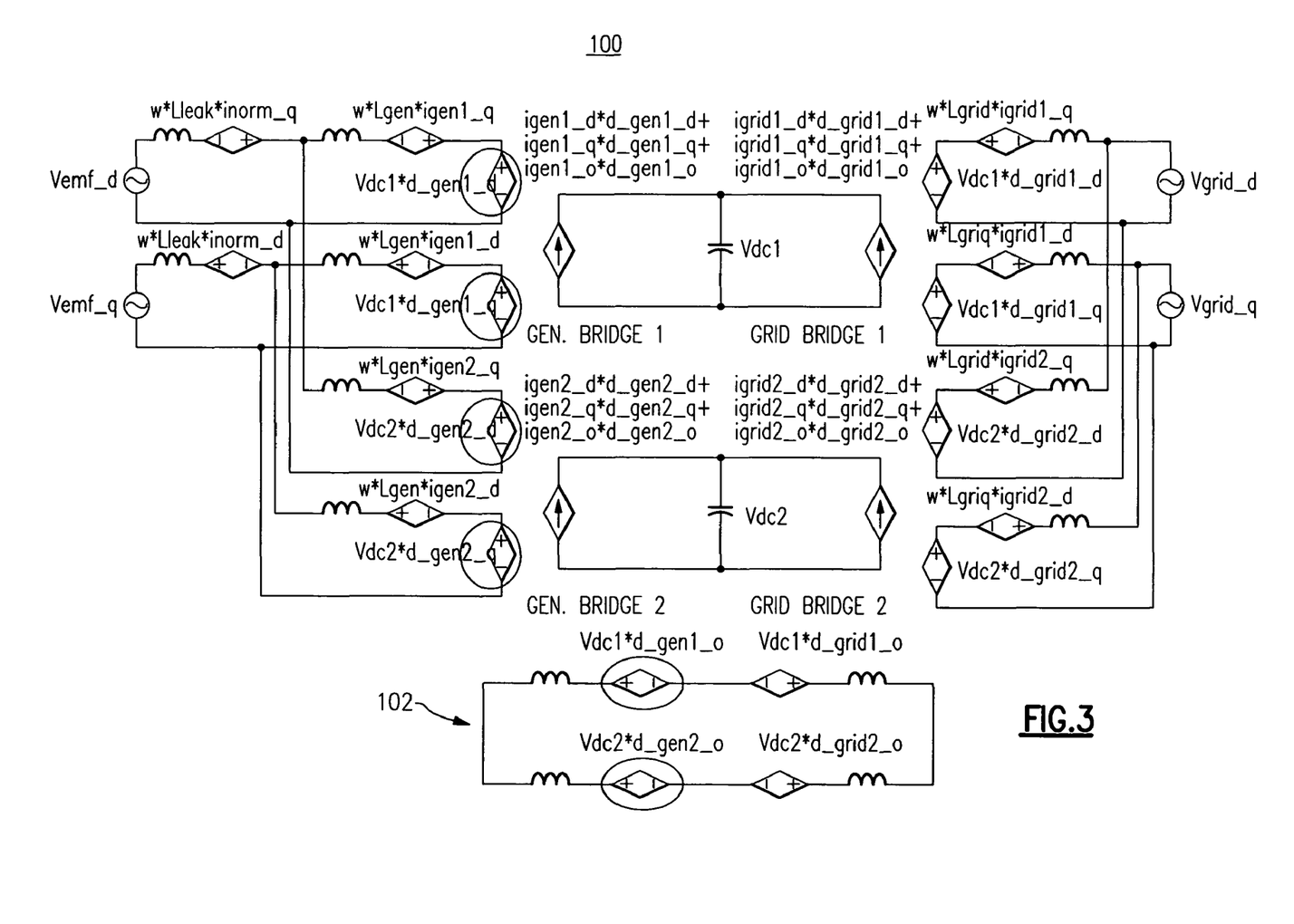
FIG. 3 illustrates a high level equivalent circuit for the power converter stage shown in FIGS. 1 and 2, and that depicts the control plant parameters in terms of d-q (rotating coordinates), changing a three-phase AC variable into DC variables in steady state.

FIG. 3 illustrates a high level equivalent circuit for the power converter stage shown in FIGS. 1 and 2, and that depicts the control plant parameters in terms of d-q (rotating coordinates), changing a three-phase AC variable into a pair DC control variables in d-q rotating frame. The three phase bridge circuits 25, 27, 29, 31 depicted in FIG. 1 have been transformed in FIG. 3 into equivalent circuits in rotating (d and q) coordinates. Each bridge circuit 25, 27, 29, 31 can be seen to now include a respective d-channel and a respective q-channel. Control circuit 100 can be seen to also include an o-channel (common mode channel) 102.

Figure 4:
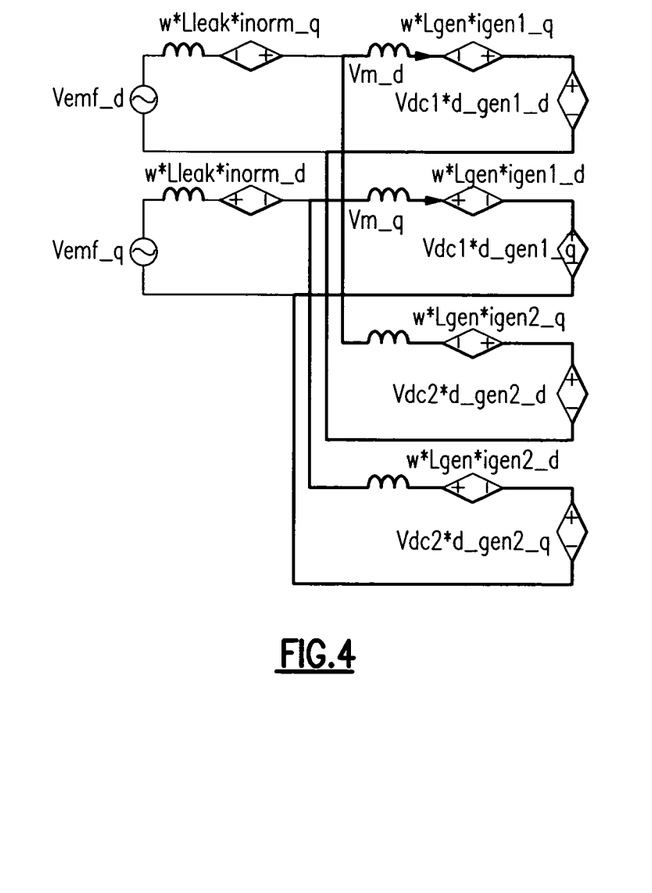
FIG. 4 illustrates the equivalent circuit in rotating coordinates of the generator side converter, which is a portion of the high level equivalent circuit shown in FIG. 3.
Figure 5:
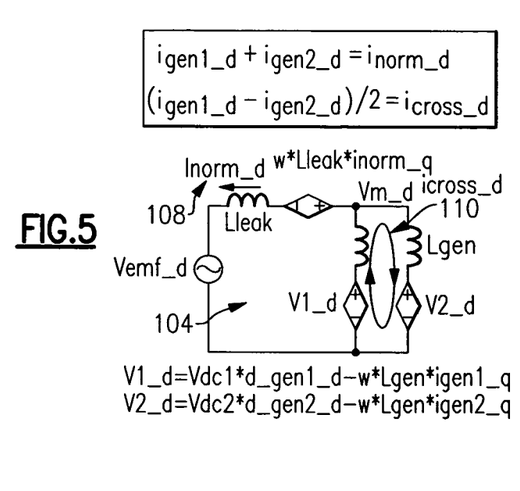
FIG. 5 illustrates a simplified d-channel subcircuit for a portion of the equivalent circuit of FIG. 4.
Figure 6:
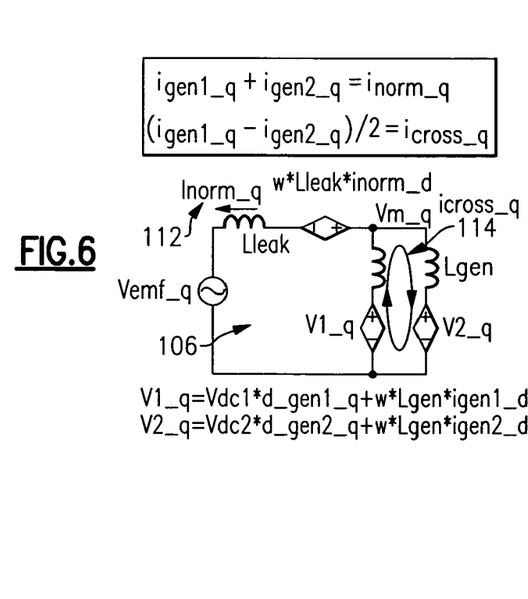
FIG. 6 illustrates a simplified q-channel subcircuit for a portion of the equivalent circuit of FIG. 4.

FIG. 4 illustrates a portion (wind generator side converter without DC link) of the power stage circuit model shown in FIG. 3; while FIG. 5 illustrates a simplified equivalent circuit of FIG. 4 in d-channel and FIG. 6 illustrates a simplified equivalent circuit of FIG. 4 in q-channel. The circuit diagrams depicted in FIGS. 4-6 represent a simplified analytical tool that includes a simplified d-channel subcircuit 104 in FIG. 5 and a simplified q-channel subcircuit 106 in FIG. 6. Subcircuits 104, 106 are particularly useful to more distinctly describe a normal mode current loop and a differential mode cross current loop. The d-channel subcircuit 104 can be seen to include a normal mode current component 108 and a differential mode cross current component 110. Similarly, the q-channel subcircuit 106 can be seen to include a normal mode current component 112 and a differential mode cross current component 114.

Figure 7:
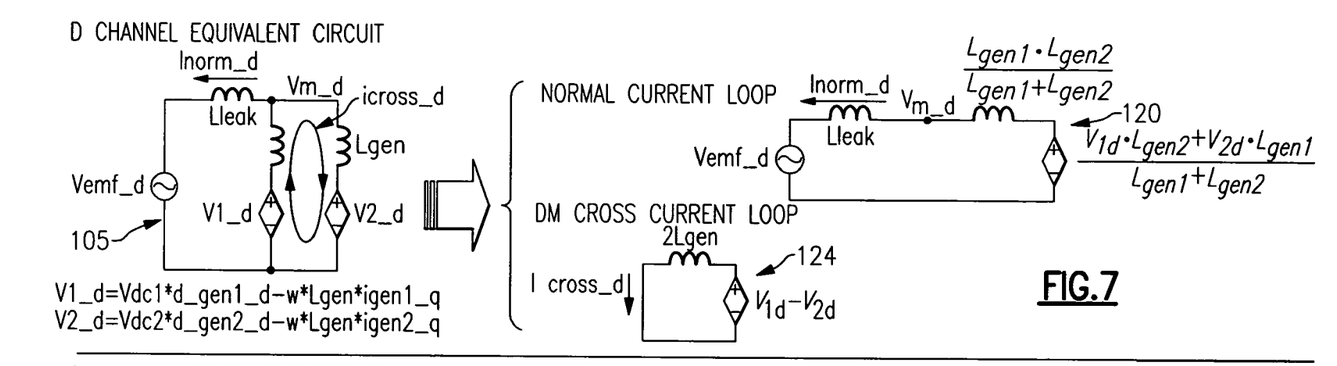
FIG. 7 illustrates a derived equivalent circuit from FIG. 4 for normal current and differential mode cross current in d-channel.
Figure 8:
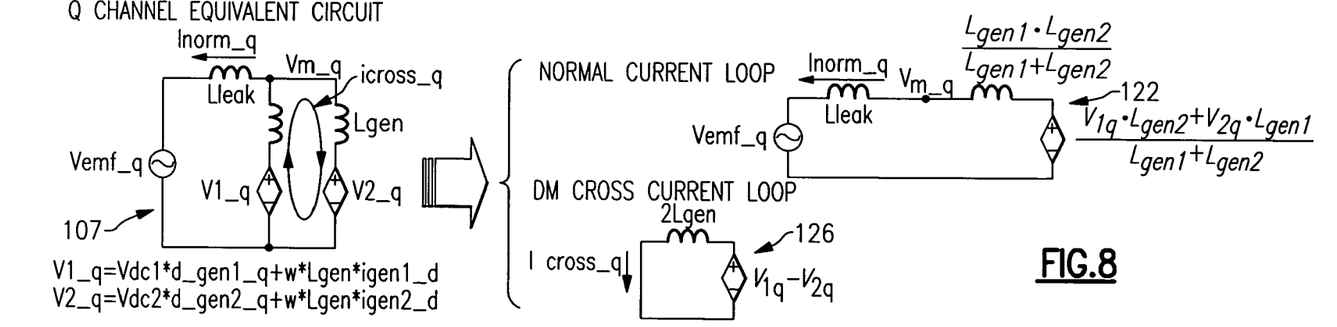
FIG. 8 illustrates a derived equivalent circuit of FIG. 4 for normal current and differential mode cross current in q-channel.
Figure 9:
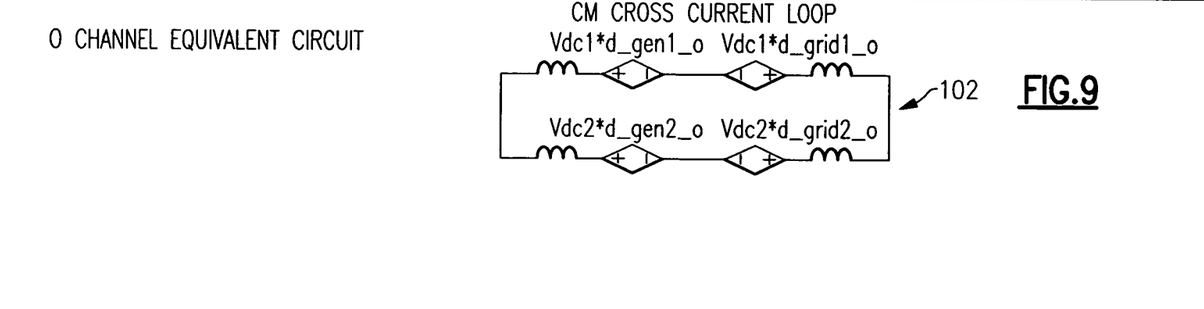
FIG. 9 illustrates the o-channel equivalent subcircuit for the control plant shown in FIG. 3, and represents an equivalent circuit for common mode cross current.

FIG. 7 illustrates a derived equivalent circuit of FIG. 4 for normal current and differential mode cross current in d-channel; while FIG. 8 illustrates a derived equivalent circuit of FIG. 4 for normal current and differential mode cross current in q-channel. FIG. 9 simply depicts the o-channel subcircuit 102 shown in FIG. 3. Subcircuits 105, 107 and 102 more clearly illustrate the normal mode current control plant, differential mode cross current control plant, and the common mode cross current control plant for the high level equivalent circuits shown in FIGS. 3 and 4. Subcircuits 105 and 107 are each shown split into a respective normal current loop 120, 122 and a respective differential mode cross current loop 124, 126. Importantly, the control plant associated with each normal current loop 120, 122 can be seen to be completely different from the control plant associated with each respective differential mode cross current loop 124, 126. This characteristic is important since it highlights the nature that it is impossible to have one control regulator that results in optimum control performance for both a normal current loop and a differential mode cross current loop.

Figure 10:
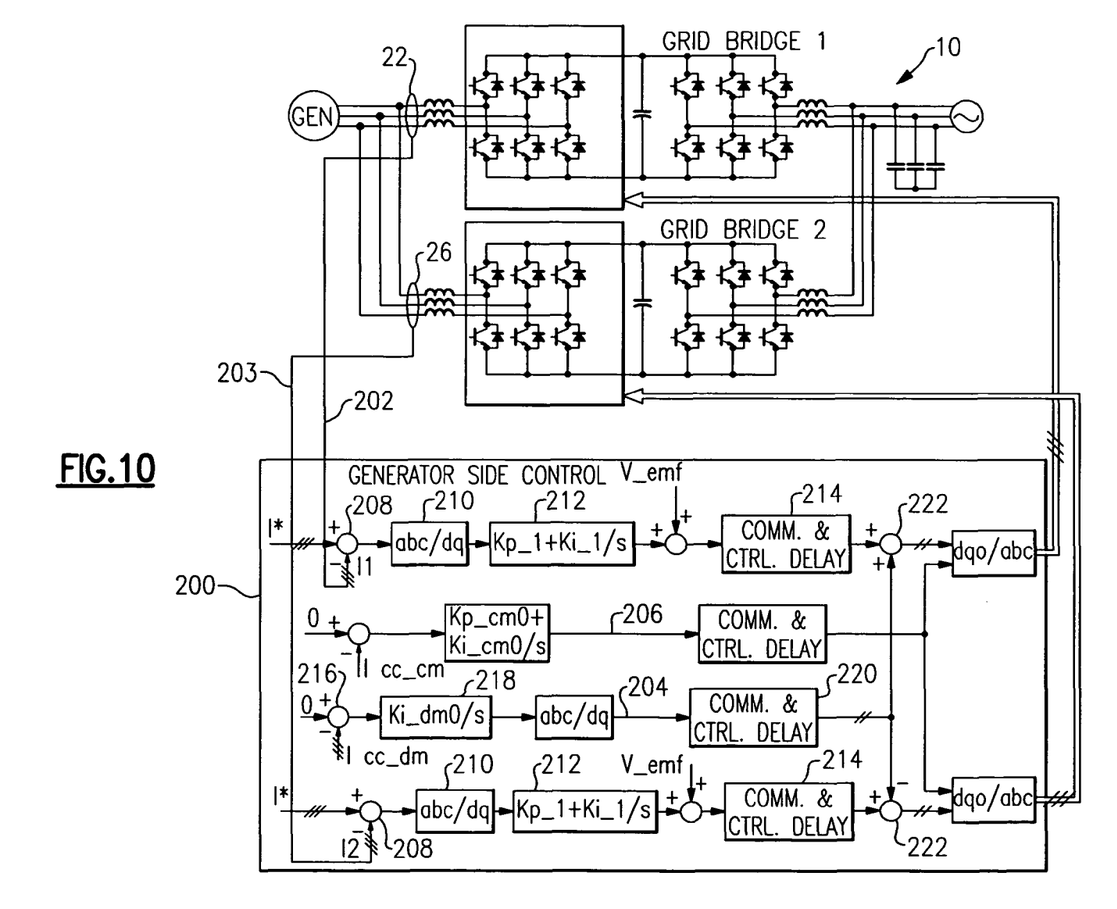
FIG. 10 illustrates a modular thread current based regulator including for each thread, a negative feedback control loop for controlling a thread current to follow a normal mode thread current command, separate slow control loops for controlling a differential mode cross current and common mode cross current to prevent them from having a DC offset in steady state.

FIG. 10 illustrates a modular thread current based regulator 200 including for each thread 22, 26, a negative feedback control loop 202, 203 for controlling a thread current to follow a normal mode thread current command, separate slow control loops 204, 206 for controlling a differential mode cross current and common mode cross current to prevent them from having a DC offset in steady state. Each control loop 202, 203 senses a respective thread current $I_1$ or $I_2$ that is driven to a desired thread normal mode current command value $I^*$. Importantly, there is absolutely no communication between control loops 202 and 203. During the interleaving process associated with each of the power converter bridges, a differential mode cross current will be generated. If interleaving is conducted through inductors on both sides of the power converter 10, then a common mode cross current will also be generated, as stated herein before. These cross currents will, of course, make it impossible for each control loop 202, 203 to drive the respective thread currents to their desired thread normal mode current command value $I^*$, since any cross current(s) will become a disturbance to the normal current control loop.

With continued reference to FIG. 10, each measured thread current is first compared 208 with the thread normal mode current command value $I^*$. The resultant error is then transformed 210 into d and q rotating coordinates by converting three phase variables into DC variables. The d and q variables are then processed via a standard PI (proportional-integral) or I (integral) current regulator 212. A feed forward term is then added to the regulated variables to improve the feedback loop performance. Block 214 simply represents a communication and time delay in the control loop due to modulation effects of sampling.

Common mode cross current loop 206 is simply an add-on that is provided to drive any existing common mode cross current value to zero. This loop is included simply to regulate out any DC bias that may exist in association with the common mode cross current; and thus, a dq transformation is not required for the common mode cross current loop 206. Numeral 214 depicts the communication and sampling delay. The communication and sampling delay in a cross current loop may be different from the delay in a thread current loop.

Differential mode cross current loop 204 is another add-on feature that is provided to drive any existing differential mode cross current value to zero. The measured differential mode cross current is first compared with zero 216 and then processed via an integrator 218 to ensure any DC portion remains under control. The time delay 220 associated with the differential mode cross current loop 204 may be different than the time delay associated with each thread current loop 202, 203 due to sampling and communication delays generated during measurements between the threads.

In summary explanation, the common mode cross current loop 206 and differential mode cross current loop 204 generate output values that are added 222 to the regulated output values associated with the normal mode thread current regulators 212 to ensure that any DC content remains under control and prevent the control system from becoming unstable. The regulator output signals are then transmitted to respective bridge circuits to control the pulse width modulation suitable to achieve the desired interleaving.

Figure 11:
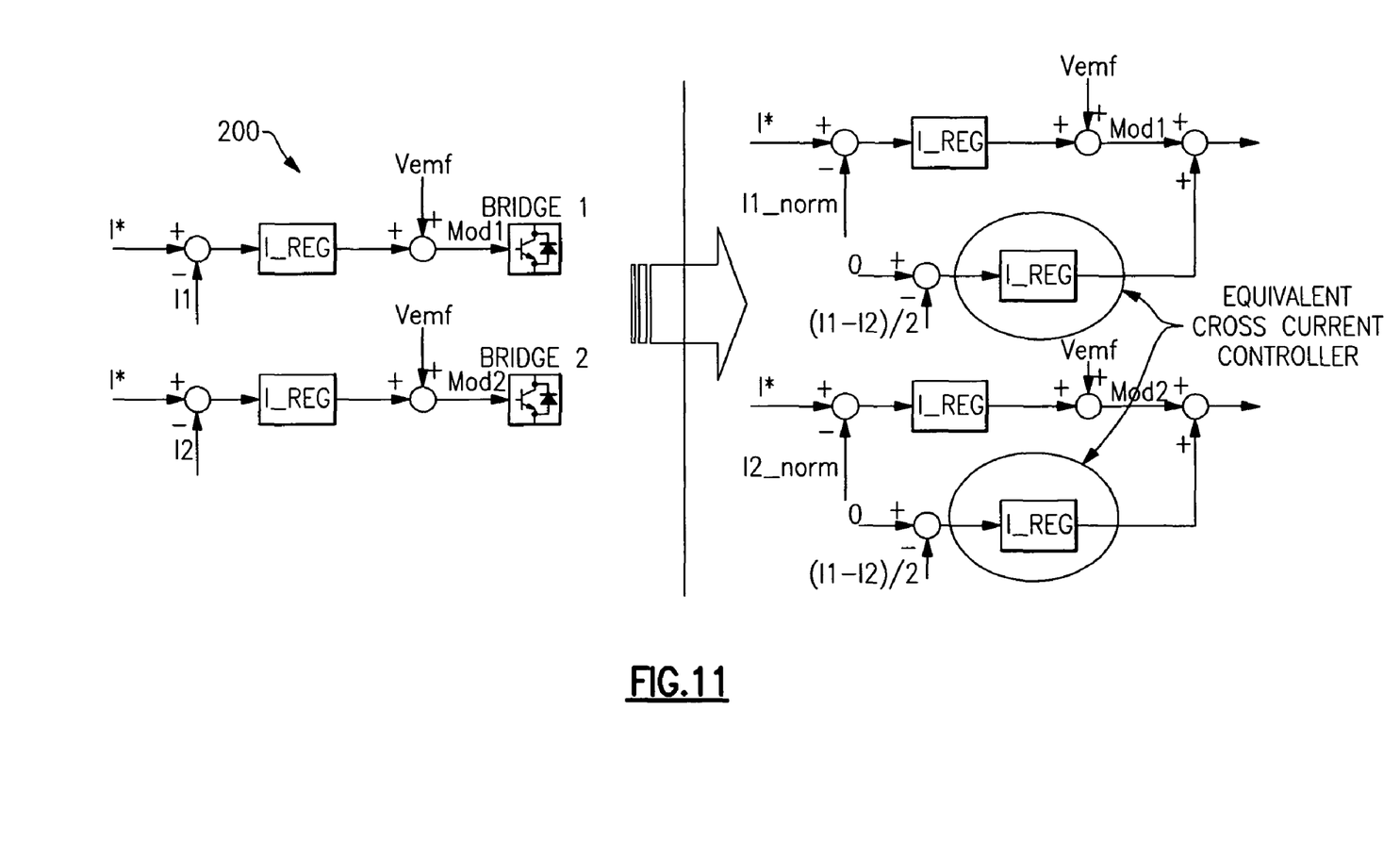
FIG. 11 is a variation of FIG. 10 to illustrate the control effect for normal current and cross current separately.

FIG. 11 is a variation of FIG. 10 to illustrate the control effect for normal current and cross current separately. The essence of FIG. 11 serves to illustrate that, for this embodiment, each thread normal mode current control loop is regulated with a regulator that is identical with the regulator used to control the respective thread cross current. Since the plant (e.g. loop impedance) for the normal mode current control loop is different from the plant associated with the differential mode cross current, a tradeoff will thus be desired when controlling both control loops using an identical regulator in each loop. This embodiment thus requires a compromise between the normal mode current control loop and the differential mode cross current control loop to achieve a result that is workable.

Figure 12:
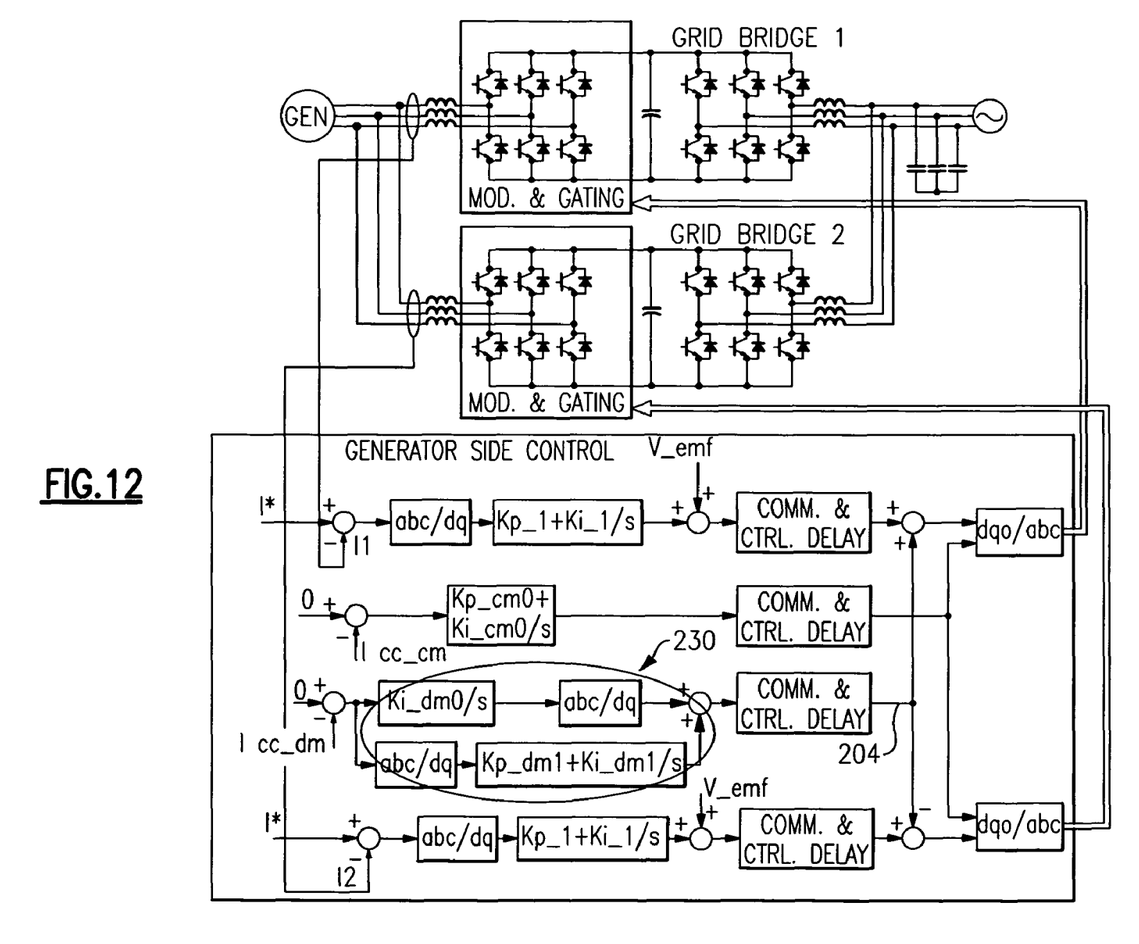
FIG. 12 illustrates the modular thread current based regulator shown in FIG. 10 modified with an additional cross current regulator in the differential mode cross current control loop.

FIG. 12 illustrates the modular thread current based regulator 200 shown in FIG. 10 modified with an additional cross current regulator 230 in the differential mode cross current control loop 204. Not only the DC component in differential mode cross current, but also the fundamental frequency component in differential mode cross current are regulated to zero under steady state.

Figure 13:
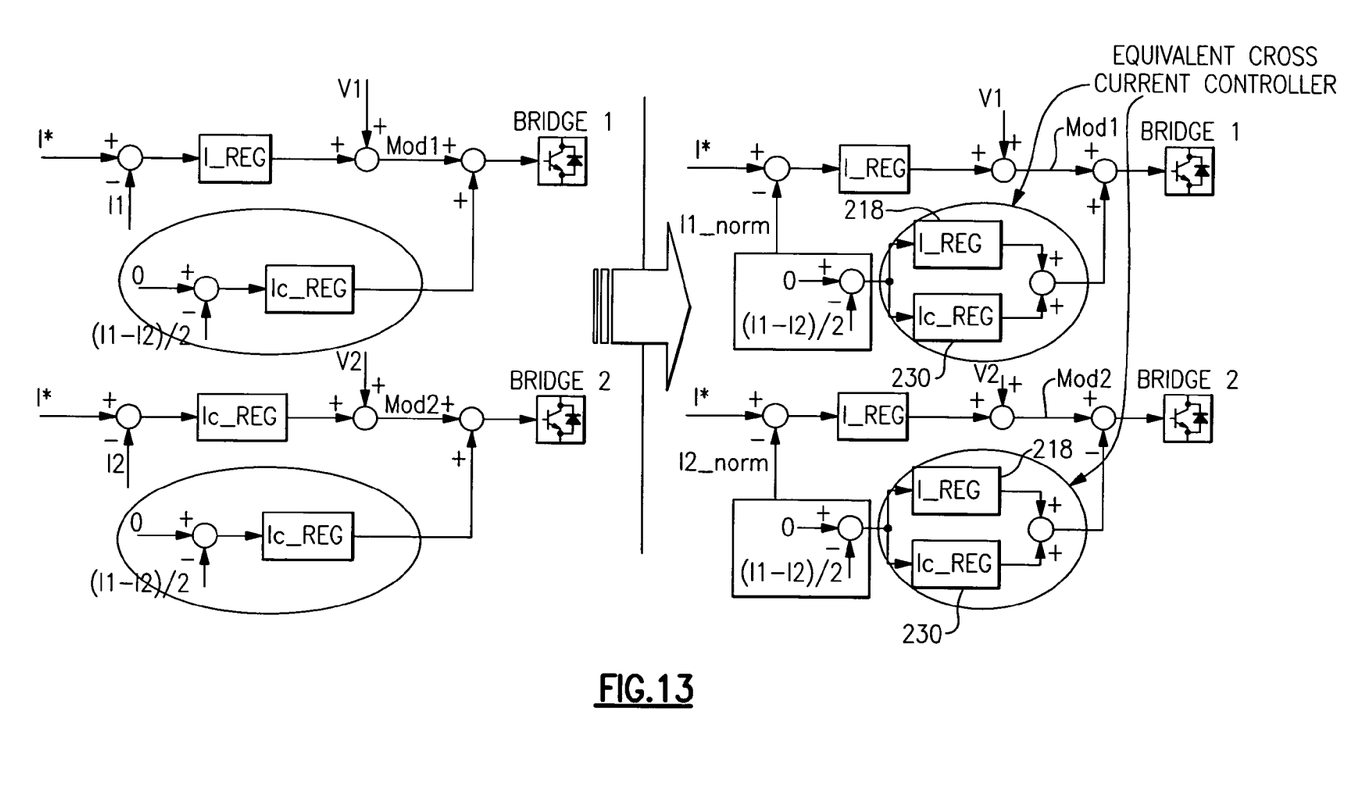
FIG. 13 is a variation of FIG. 12 to illustrate the control effect for normal current and DM cross current separately.

FIG. 13 is a variation of FIG. 12 to illustrate the control effect for normal current and DM cross current separately. Additional differential mode cross current regulator 230 operates to cancel the negative impact of differential mode cross current regulator 218 and add the desired stability control in the differential mode cross current.

Figure 14:
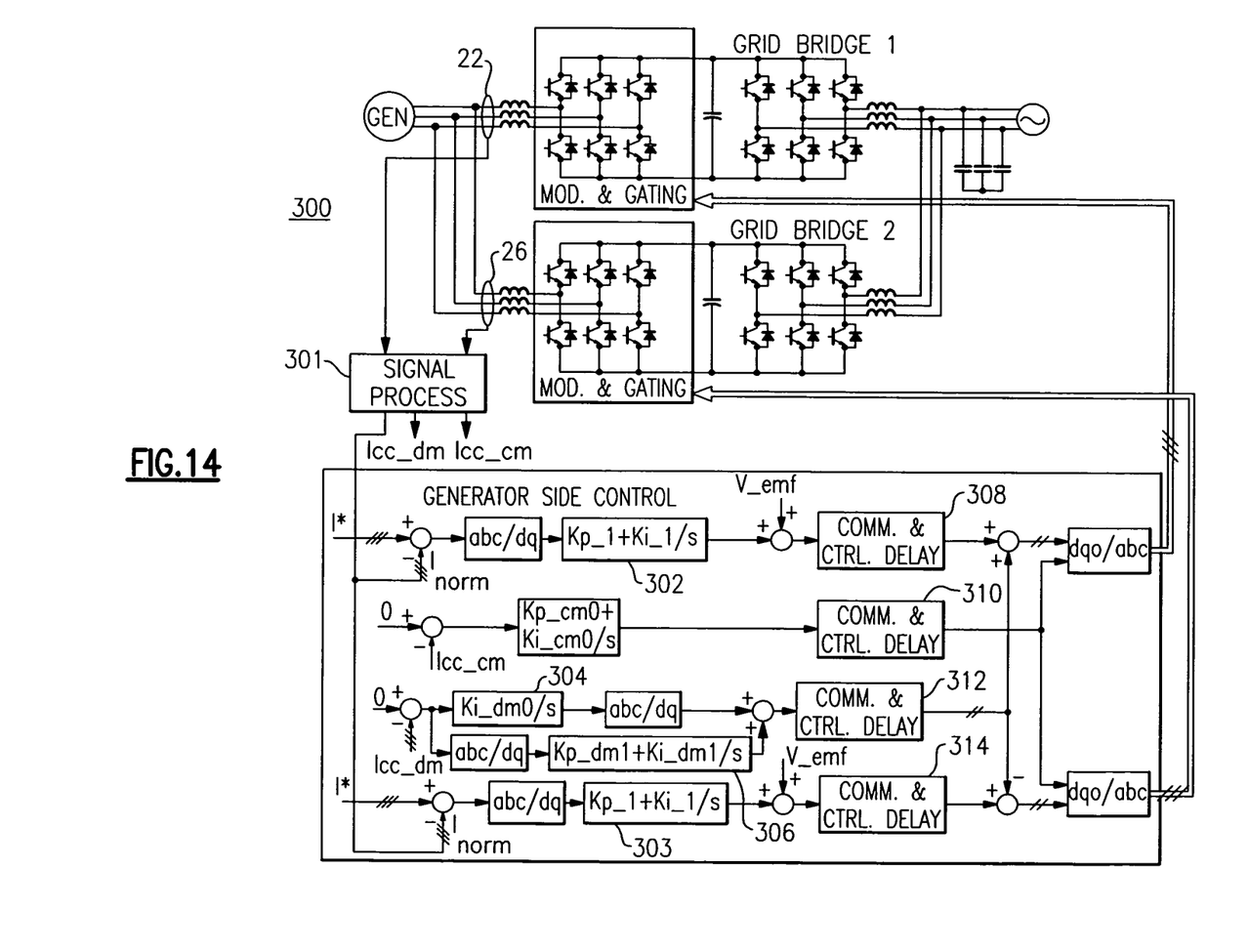
FIG. 14 illustrates a two-level back-to-back power converter cross current control system architecture that includes separate normal mode, common mode cross current and differential mode cross current based regulators according to one embodiment of the invention.

FIG. 14 illustrates a two-level back-to-back power converter cross current control system 300 architecture that includes separate normal mode 302, 303 and differential mode cross current based regulators 304, 306, according to one embodiment of the invention. This embodiment operates to provide system control based on the nature of the current rather than on the location of the current as described for the thread based current control techniques discussed herein before with reference to FIGS. 10-13. This, system control based on the nature of the currents is achieved by implementing a control scheme in which the normal mode current plant is completely different from the plant associated with differential mode cross current control.

With continued reference to FIG. 14, thread currents from each thread 22, 26 are measured and sent to a signal processor 301 that computes a normal mode current portion, a differential mode cross current portion and a common mode cross current portion for each thread 22, 26. This embodiment will provide cross current control in a manner that is superior to the techniques described herein before that are based on the location of the normal mode current and differential mode cross currents. Importantly, improved cross current control is achieved when the communication delays 308, 310, 312, 314 are minimized.

Figure 15:
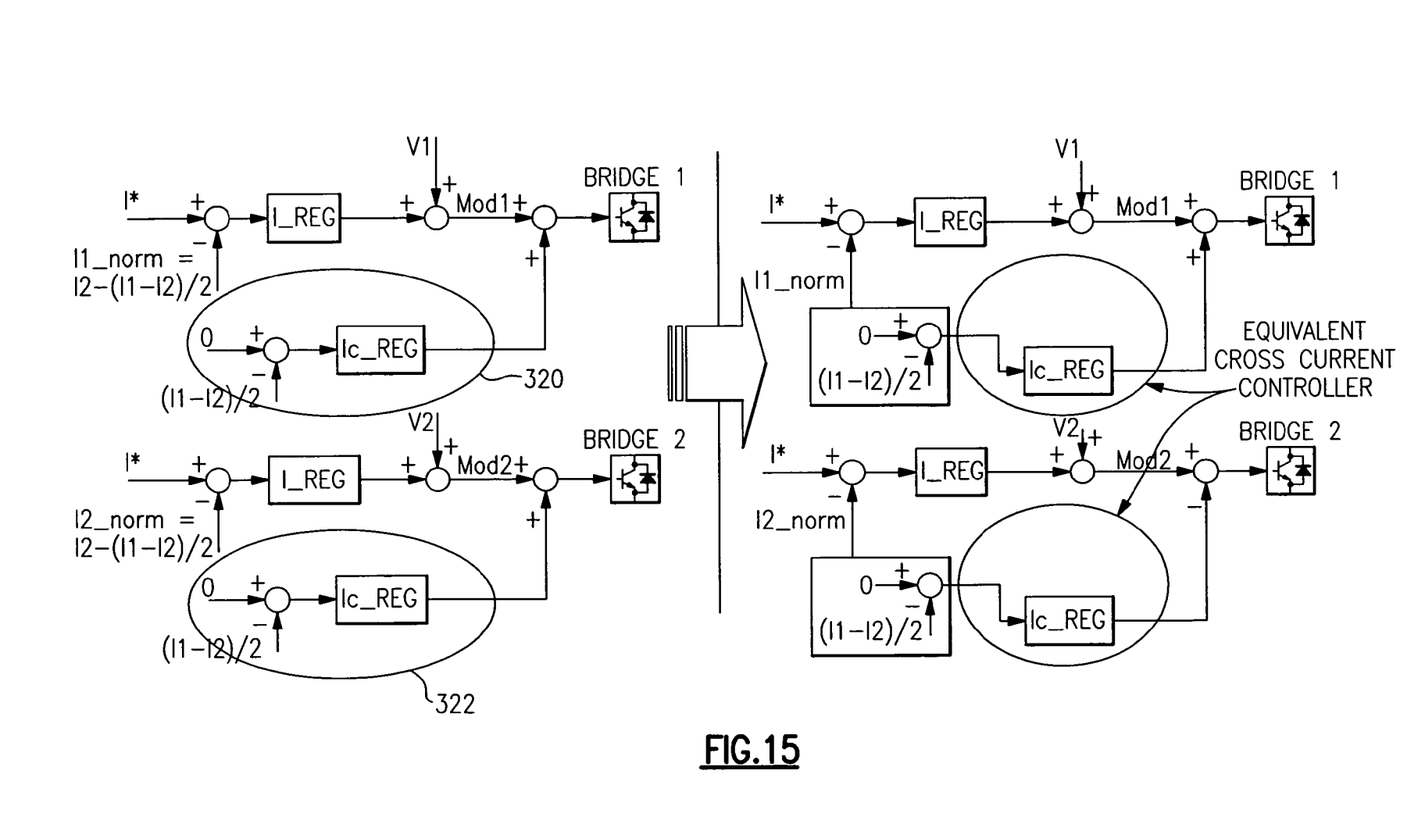
FIG. 15 is a variation of FIG. 14 to illustrate the control effect for normal current and DM cross current separately.

FIG. 15 is a variation of FIG. 14 to illustrate the control effect for normal current and DM cross current separately. The measured normal current I1_norm, I2_norm, identified with each respective thread 22, 26 is each first compared with a normal current command value I*. The differential mode cross current (I1−I2)/2 identified with each respective thread 22, 26 is also driven toward zero as seen in control loops 320, 322. Importantly, control of each normal mode current is optimized for its own plant with the regulator I_Reg and each differential mode cross current is optimized for its own plant with the regulator Ic_Reg.

Figure 16:
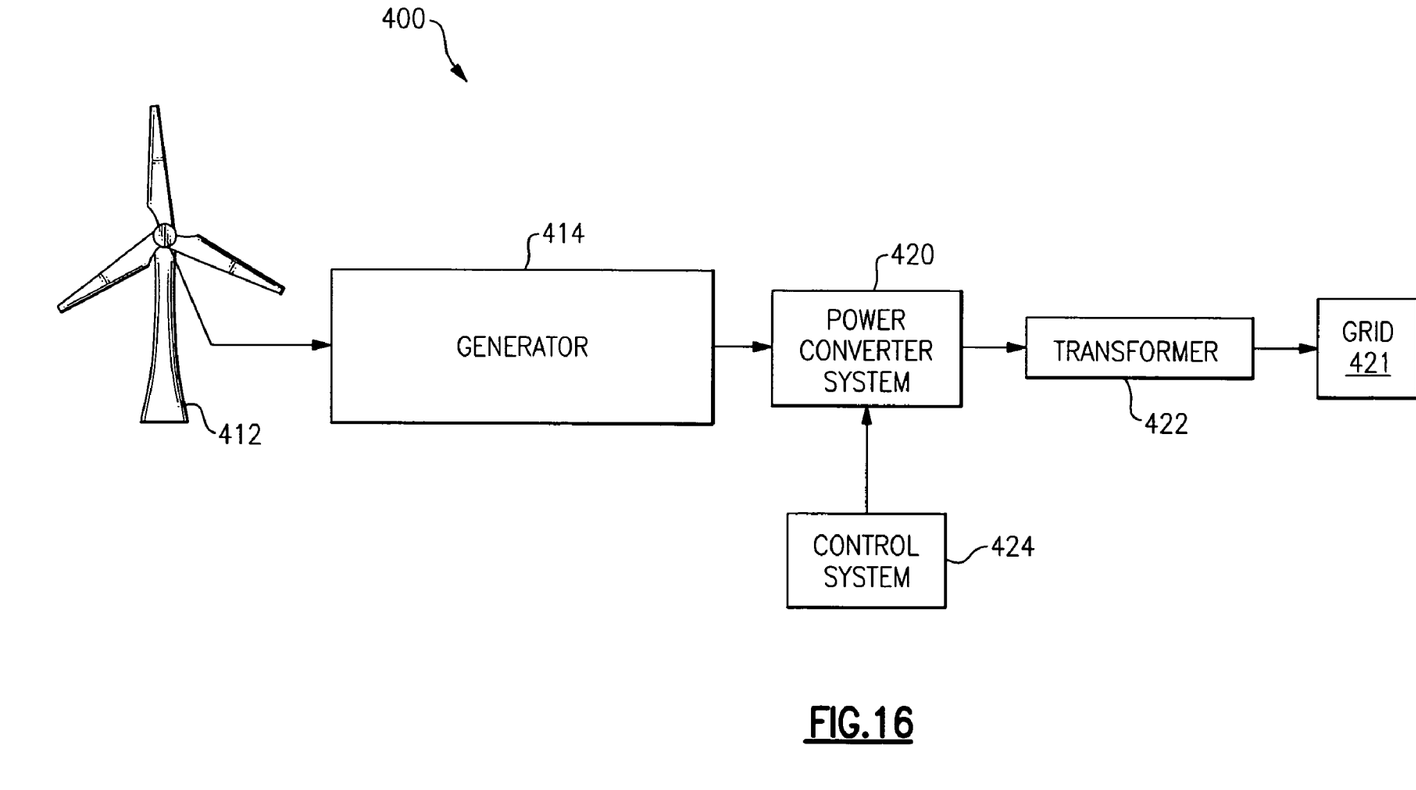
FIG. 16 is a simplified block diagram illustrating a wind turbine system that employs a power conversion system including a back-to-back, bidirectional, two-thread power converter system according to one embodiment of the invention.

FIG. 16 is a block diagram illustrating an application example, which includes a bidirectional, two-thread power converter system 420. The source is a wind turbine 412 driving a generator 414. A current control system 424 comprises either a thread based current control system or a current control system based on the nature of the currents to be controlled as discussed herein before with reference to FIGS. 1-15.

Although the embodiments shown in FIGS. 1-15 have been described for a symmetrical back-to-back, bidirectional, two-level interleaved power converter cross current control system having a pair of three phase threads coupled in parallel, and including coupling inductors 30 in each phase of each thread 22, 26, the power converter cross current control system can be implemented using transformers 422 on one or both sides of the DC link 16. FIG. 16 shows a transformer block 422 on the load (grid) 421 side of the power conversion system 400.

Conversion and inversion methods suitable for changing the topology from inductor coupled to transformer coupled are easily implemented by those skilled in the power conversion art, and so are not discussed in further detail herein to provide brevity and further enhance an understanding of the embodiments described herein.

Use of coupling transformers on either one or both sides will, of course, eliminate the common mode cross current path 34 shown in FIG. 2; while coupling inductors 30 on both sides of the DC link 16 may cause the common mode cross current 34.

Interleaving in the back-to-back power converter system 10 can also be implemented at either one or both sides of the DC link 16 as stated herein before. Differential mode cross current regulation should then be implemented on each side of the DC link 16 that is subjected to interleaving. Even if only one side of the DC link 16 is interleaved, both sides may still employ differential mode cross current regulation to enhance system performance and reliability.

Further, although the power conversion system 400 is depicted as generating power from a wind turbine 412, the power conversion system 400 can be easily adapted for use in drive systems for oil and gas applications, or for use in industrial drive systems, wherein the power grid 421 becomes the power source and the wind turbine 412 becomes the drive system (load).

An important feature of the power converter cross current control system described herein before is directed to isolation of faulty threads in a multi-thread power converter cross current control system. Techniques suitable for implementing such thread isolation are easily implemented by those skilled in the power conversion and control arts, and so will not be described further, to preserve brevity, and further enhance an understanding of the cross current control concepts described herein. These techniques can be used to isolate a faulty power converter thread, while continuing to provide power to a load from any remaining fault-free power converter threads; although any power provided by the fault-free power converter threads may in some circumstance, be reduced from that available when all power converter threads are working together to provide the power conversion.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A method for controlling cross current in an interleaved power converter system comprising a plurality of converter threads coupled in parallel, the method comprising:
   collecting a feedback current from each thread;
   obtaining a normal current and a differential mode current for each thread, based on its respective feedback current;
   regulating the normal current of each thread to a commanded thread normal current value via a respective normal current control loop based on d-q rotating frame parameters;
   regulating a differential mode cross current of each thread to zero via a respective differential mode cross current control loop based on d-q rotating frame parameters; and
   regulating a differential mode cross current DC offset of each thread to zero via a respective differential mode cross current control loop based on stationary frame parameters.

2. The method of claim 1, wherein the method further comprises controlling the plurality of threads to isolate one or more faulty threads in the multiple converter threads.

3. The method of claim 1, wherein the interleaved power converter system comprises a galvanic isolation transformer coupling interleaved converter system or a direct coupling interleaved converter system.

4. The method of claim 3, further comprising:
   obtaining a system common mode cross current when the interleaved power converter system comprises a direct coupling interleaved converter system; and
   regulating the system common mode cross current of the threads to zero via a common mode cross current control loop based on stationary frame parameters.

5. The method of claim 1, wherein the interleaved power converter system comprises a multi-level interleaved converter topology.

6. The method of claim 1, wherein the interleaved power converter system is adapted for use in a wind turbine, for use in drive systems for oil and gas applications, or for use in industrial drive systems.

7. An interleaved power converter control system for a plurality of power converter threads arranged in parallel, the control system comprising:
   a signal processing section configured to collect feedback currents from the plurality of threads and determine a normal current and a differential mode current for each thread;
   a normal current control loop based on d-q rotating frame parameters for each thread to regulate its normal current to a commanded thread normal current value;
   a differential mode cross current control loop based on d-q rotating frame parameters for each thread to regulate its differential mode cross current to zero; and
   a differential mode cross current control loop based on stationary frame parameters for each thread to regulate its DC value to zero.

8. The interleaved power converter control system of claim 7, wherein the interleaved power converter control system comprises a galvanic isolation transformer coupled interleaved power converter system or a direct coupling interleaved power converter system, and further comprises a common mode cross current control loop based on stationary frame parameters and configured for controlling a common mode cross current component in the thread current when the interleaved power converter system comprises a three-phase direct coupling interleaved power converter system.

9. An interleaved power converter control system for a plurality of power converter threads arranged in parallel, the control system comprising thread current control loop based on d-q rotating frame parameters in each thread of the interleaved power converter control system, wherein each thread current control loop is configured to independently regulate a thread current in a respective thread of the interleaved power converter system by driving a respective thread feedback current towards a normal mode thread current command value, and further comprising a slow differential mode cross current control loop based on stationary frame parameters and operational to control differential mode cross current components in each thread, to ensure there is substantially no DC offset in the differential mode cross current.

10. An interleaved power converter control system for a plurality of power converter threads arranged in parallel, the control system comprising a thread current control loop based on d-q rotating frame parameters in each thread of the interleaved power converter control system, wherein each thread current control loop is configured to independently regulate a thread current in a respective thread of the interleaved power converter system by driving a respective thread feedback current towards a normal mode thread current command value, wherein the interleaved power converter system comprises a galvanic isolation transformer coupled interleaved converter system or a direct coupling interleaved power converter system, the interleaved power converter control system further comprising a thread current regulator based slow common mode cross current loop based on stationary parameters and operational to regulate a common mode cross current for the plurality of threads to ensure there is substantially no DC offset in the common mode cross current when the interleaved power converter system comprises a direct coupling interleaved power converter system.

* * * * *